United States Patent [19]

Jones

[11] 4,249,390
[45] Feb. 10, 1981

[54] AIR CONDITIONING SYSTEM

[76] Inventor: William M. Jones, Country Club Rd., Pocahontas, Ark. 72455

[21] Appl. No.: 69,051

[22] Filed: Aug. 23, 1979

[51] Int. Cl.³ .................... F25B 27/02; F25B 13/00
[52] U.S. Cl. ........................... 62/238 E; 62/324 D
[58] Field of Search .................... 62/238 E, 324 D

[56] References Cited

U.S. PATENT DOCUMENTS

| | | | |
|---|---|---|---|
| 2,102,940 | 12/1937 | Buchanan | 62/238 E |
| 3,188,829 | 6/1965 | Siewert et al. | 62/324 D |
| 3,308,877 | 3/1967 | Gerteis | 62/324 D |
| 3,366,166 | 1/1968 | Gerteis | 62/324 D |
| 3,777,508 | 12/1973 | Imabayashi et al. | 62/324 D |
| 3,916,638 | 11/1975 | Schmidt | 62/238 E |
| 4,098,092 | 7/1978 | Singh | 62/324 D |
| 4,142,379 | 3/1979 | Kuklinski | 62/238 E |
| 4,148,355 | 4/1979 | Gehring | 62/238 E |
| 4,168,745 | 9/1979 | Lastinger | 62/238 E |
| 4,199,955 | 4/1980 | Jonsson | 62/238 E |

*Primary Examiner*—Lloyd L. King
*Attorney, Agent, or Firm*—Walker & McKenzie

[57] ABSTRACT

An air conditioning system for use with a hot water tank. The air conditioning system includes a first water-refrigerant heat exchanger for removing heat from compressed refrigerant and for heating water to be stored in the hot water tank, a second water-refrigerant heat exchanger for selectively removing heat from or adding heat to refrigerant, and an air-refrigerant heat exchanger for selectively removing heat from or adding heat to the refrigerant whereby air is selectively cooled or heated.

1 Claim, 4 Drawing Figures

AIR CONDITIONING SYSTEM

BACKGROUND OF THE INVENTION

1. Field of the Invention

This invention relates in general to air conditioning systems for selectively heating and/or cooling the air within a house, building or the like.

2. Description of the Prior Art

Heretofore, various systems have been developed for heating and cooling the air within a house, building or the like. Some heat pump type air conditioning systems consist in general of a compressor for compressing a refrigerant, a water-to-refrigerant heat exchanger for adding or removing heat from the refrigerant, and an air-to-refrigerant heat exchanger (commonly called a coil) for causing an exchange of heat between the refrigerant and the air within the house to thereby cool or heat the air within the house.

SUMMARY OF THE PRESENT INVENTION

The present invention is directed towards providing an improved air conditioning system for heating and/or cooling the air within a house, building or the like. The air conditioning system of the present invention includes a compressor means for compressing refrigerant, a first water-refrigerant heat exchanger means for selectively removing heat from the refrigerant compressed by the compressor means and for selectively adding heat to water to be stored in a hot water tank, a second water-refrigerant heat exchanger means for selectively removing heat from and selectively adding heat to the refrigerant, blower means for blowing air, and air-refrigerant heat exchanger means for selectively removing heat from or adding heat to the air being blown by the blower means.

DESCRIPTION OF THE PREFERRED EMBODIMENT

The air conditioning system 11 of the present invention may be used to selectively heat and/or cool the air within a residential house, commercial building or the like.

Figure 1:
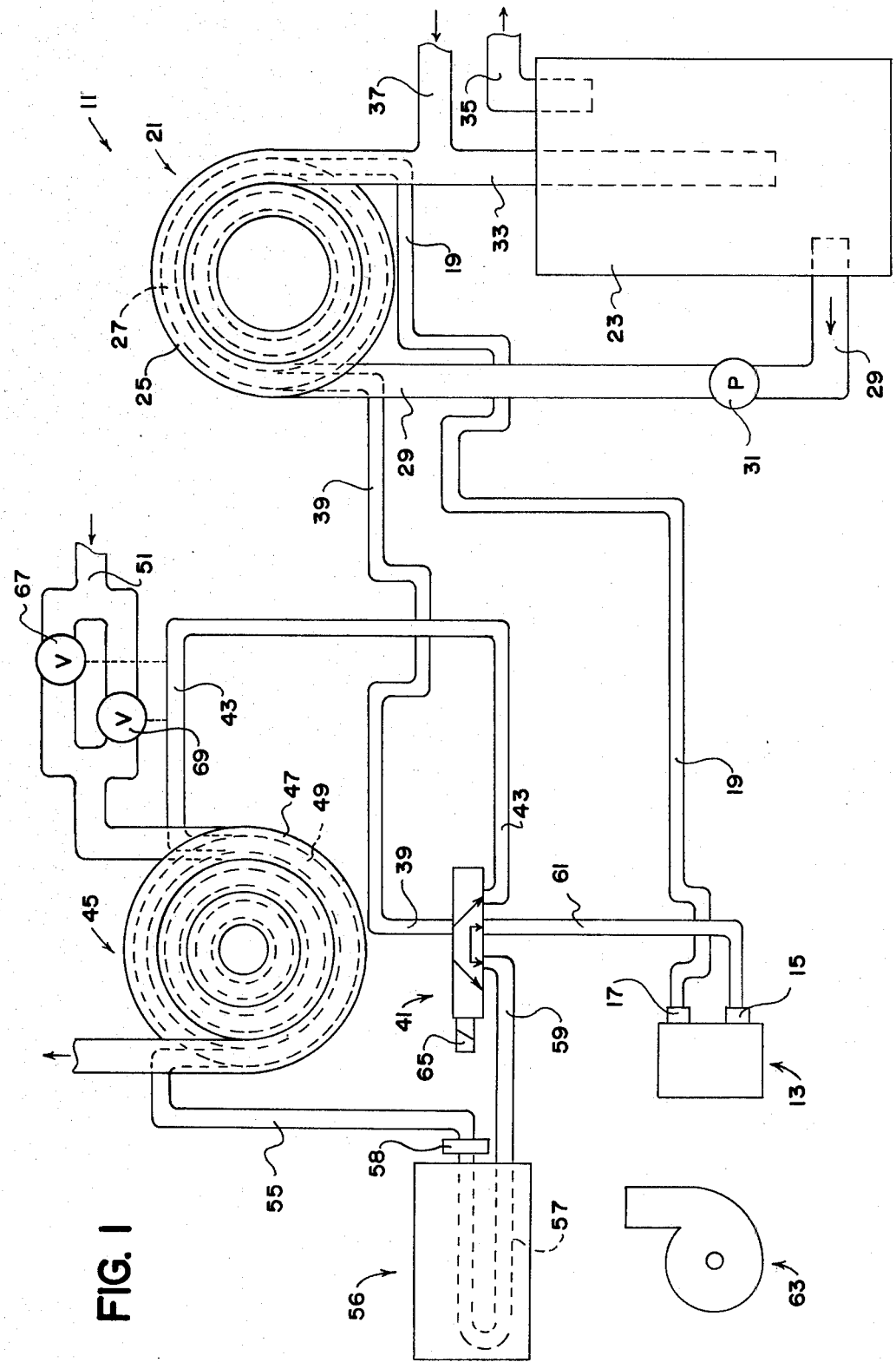
FIG. 1 is a somewhat diagrammatic view of the air conditioning system of the present invention.

The air conditioning system 11 includes a compressor means 13 (see FIG. 1) for compressing a refrigerant such as Freon in any manner apparent to those skilled in the art. The compressor means 13 may be of any standard construction well known to those skilled in the art and includes an inlet port 15 through which the refrigerant is drawn into the compressor means 13 and an outlet port 17 through which the refrigerant is expelled or pumped from the compressor means 13. The refrigerant will gain heat when it is compressed. Thus, for example, refrigerant being pumped from a common three-ton compressor means will typically have a temperature in the neighborhood of 190° F.

Figure 3:
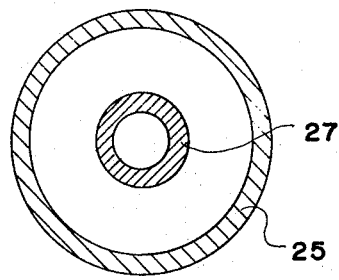
FIG. 3 is a sectional view of a portion of the first water-refrigerant heat exchanger means of the air conditioning system of the present invention.

The outlet port 17 of the compressor means 13 is coupled by way of hollow tubing 19 or the like to a first water-refrigerant heat exchanger means 21 which selectively removes heat from the refrigerant compressed by the compressor means 13 and adds the heat so removed to water to be stored in a hot water tank 23. The first water-refrigerant heat exchanger means 21 includes an outer coil of hollow tubing 25 and an inner coil of hollow tubing 27 located within the outer coil of hollow tubing 25 (see FIG. 3). The tubing 19 and the inner coil of hollow tubing 27 are attached to one another whereby the refrigerant compressed by the compressor means 13 will pass through the tubing 19 and into the inner coil of hollow tubing 27. The outer coil of hollow tubing 25 receives water from the hot water tank 23 through hollow tubing 29 and an electric pump 31 (see FIG. 1). The tubing 29 is preferably connected to the lower section of the hot water tank 23 so that water from the lower section of the hot water tank 23 will be conveyed through the tubing 29 and into the outer coil of hollow tubing 25. It should be noted that water located at the lower section of the hot water tank 23 will normally be the coolest water in the hot water tank 23 while water located at the upper section of the hot water tank 23 will normally be the hottest water in the tank 23 for reasons which will be apparent to those skilled in the art. Thus, it will be apparent to those skilled in the art that when refrigerant compressed by the compressor means 13 is flowing through the inner coil of hollow tubing 27 and when water from the lower section of the hot water tank 23 is flowing through the outer coil of hollow tubing 25, heat will be transferred from the refrigerant to the water. Thus, for example, assuming that the refrigerant flowing through the tubing 19 has a temperature of 190° F. and that the water being pumped from the hot water tank 23 through the tubing 29 has a temperature in the neighborhood of 75° F., the first water-refrigerant heat exchanger means 21 will typically reduce the temperature of the refrigerant to around 105° F. and will typically raise the temperature of the water flowing through the tubing 29 to around 90° F. A hollow tubing 33 is attached to the outer coil of hollow tubing 25 to transfer water therefrom back to the hot water tank 23 after the water has travelled through the outer coil of hollow tubing 25. The tubing 33 preferably extends into the lower section of the hot water tank 23. It should be noted that a typical hot water tank has thermostat means (not shown) located in the upper section thereof for normally activating the heating elements (not shown) of the tank when the water in the upper section thereof drops below a certain predetermined amount (normally 135° F.). Expelling the heated water from the outer coil of hollow tubing 25 into the lower section of the hot water tank 23 rather than into the upper section thereof, will prevent the water (which may have a temperature in the neighborhood of 90° F.) from activating the thermostat means, etc. This water will then slowly rise to its own temperature level. The coolest water in the tank 23 will thus always be located in the lower section thereof where it can be pumped through the tubing 29 to the first water-refrigerant heat exchanger means 21 thereby causing the first water-refrigerant heat exchanger means 21 to operate optimumly. It should be noted that the hot water tank 23 will include the typical hot water outlet tubing 35 and water inlet tubing 37 (see FIG. 1).

The water inlet tubing 37 may be coupled to the tubing 33.

Figure 4:
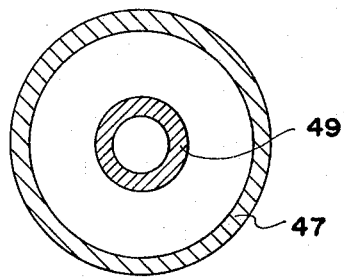
FIG. 4 is a sectional view of a portion of the second water-refrigerant heat exchanger means of the air conditioning system of the present invention.

Hollow tubing 39 is attached to the inner coil of hollow tubing 37 of the first water-refrigerant heat exchanger means 21 for conveying the refrigerant from the first water-refrigerant heat exchanger means 21 to a valve means 41. Hollow tubing 43 extends between the valve means 41 and a second water-refrigerant heat exchanger means 45. The second water-refrigerant heat exchanger means 45 is basically the same in construction as the first water-refrigerant heat exchanger means 21 and includes an outer coil of hollow tubing 47 and an inner coil of hollow tubing 49 located within the outer coil of hollow tubing 47 (see FIG. 4). The tubing 43 is attached to the inner coil of hollow tubing 49 for allowing refrigerant to pass between the valve means 41 and the inner coil of hollow tubing 49 of the second water-refrigerant heat exchanger means 45. Hollow tubing 51 extends from a source of water such as a well or the like to the outer coil of hollow tubing 41 whereby water is introduced to the outer coil of hollow tubing 47 causing an exchange of heat between the refrigerant flowing through the inner coil of hollow tubing 49 and the water flowing through the outer coil of hollow tubing 47 as will be apparent to those skilled in the art. Thus, for example, assuming that refrigerant having a temperature of 105° F. is flowing into the inner coil of hollow tubing 49 and that water having a temperature of 60° F. is flowing into the outer coil of hollow tubing 47, the second water-refrigerant heat exchanger means 45 will typically reduce the temperature of the refrigerant to around 65° F. On the other hand, assuming that refrigerant having a temperature of −22° F. is flowing into the inner coil of hollow tubing 49 and that water having a temperature of 60° F. is flowing into the outer coil of hollow tubing 47, the second water-refrigerant heat exchanger means 45 will typically raise the temperature of the refrigerant to around 45° F. The second water-refrigerant heat exchanger means 45 is preferably oversized. That is, for example, if the compressor means 13 is a three-ton unit, the second water-refrigerant heat exchanger means 45 is preferably of a size commonly used in a five-ton unit. Hollow tubing 53 extends from the outer coil of hollow tubing 47 to a drain or the like (not shown) for allowing water to exit the second water-refrigerant heat exchanger means 45 after it has passed through the outer coil of hollow tubing 47.

Hollow tubing 55 passes between the inner coil of hollow tubing 49 to an air-refrigerant heat exchanger means 56 for allowing refrigerant to pass therebetween. The air-refrigerant heat exchanger means 56 includes a coil of hollow tubing 57 for being coupled to the tubing 55. The air-refrigerant heat exchanger means 56 is preferably oversized. That is, if, for example, the compressor means 13 is a three-ton unit, the air-refrigerant heat exchanger means 56 is preferably of a size commonly used in a five-ton unit.

A typical metering device 58 is positioned between the tubing 55 and the coil of hollow tubing 57 of the air-refrigerant heat exchanger means 56 to lower the temperature of the refrigerant passing from the tubing 55 to the coil of the hollow tubing 57 of the air-refrigerant heat exchanger means 56 during the cooling cycle of the system 11. The construction of the metering device 58 will be apparent to those skilled in the art. One type metering device often used in air conditioning system is referred to as capillary tubes. In general, the metering device 58 creates a difference in pressure of the refrigerant flowing therethrough thereby creating a difference in the temperature thereof.

Hollow tubing 59 is attached to the coil of hollow tubing 57 of the air-refrigerant heat exchanger means 56 and to the valve means 41 for allowing refrigerant to pass therebetween. Hollow tubing 61 passes from the valve means 41 to the inlet port 15 of the compressor means 13 for allowing refrigerant to be drawn from the valve means 41 back to the compressor means 13.

A blower means 63 is provided for blowing air over the coil of hollow tubing 57 of the air-refrigerant heat exchanger means 56 whereby there will be an exchange of heat between the air being blown over the coil of hollow tubing 57 and the refrigerant passing through the coil of hollow tubing 57, as will be apparent to those skilled in the art. Thus, for example, refrigerant having a temperature of around 65° F. may flow through the tubing 55 into the metering device 58 where it will be lowered to a temperature of around −22° F. Assuming that air having a temperature of around 72° F. is being blown across the air-refrigerant heat exchanger means 56 and that refrigerant having a temperature of around −22° F. is flowing through the coil of hollow tubing 57, the temperature of the air will typically be reduced to around 50° F. On the other hand, assuming that refrigerant having a temperature of 190° F. is flowing into the coil of hollow tubing 58 and that air having a temperature of 72° F. is being blown over the coil of hollow tubing 57, the air-refrigerant heat exchanger means 56 will typically raise the temperature of the air to around 94° F.

The valve means 41 is controlled by solenoid means 65 or the like to reverse the flow of refrigerant through portions of the air conditioning system 11 depending on whether it is desired to heat or cool the air being blown over the coil of hollow tubing 57 by the blower means 63. Thus, when it is desired to cool the air being blown over the coil of hollow tubing 57, the valve means 43 is moved to the position shown in FIG. 1. In this position, compressed refrigerant will pass through the tubing 19 to the first water-refrigerant heat exchanger means 21 whereby the water flowing through the outer coil of hollow tubing 25 will absorb some of the heat of the refrigerant flowing through the inner coil of hollow tubing 27. The refrigerant will then pass through the tubing 39, the valve 41, and the tubing 43 to the second water-refrigerant heat exchanger means 45 whereby the water flowing through the outer coil of hollow tubing 47 will absorb much of the remaining heat of the refrigerant flowing through the inner coil of the hollow tubing 49. A heat sensitive valve means 67 is preferably coupled to the tubing 51 for controlling the flow of water to the outer coil of hollow tubing 47 in response to the pressure or temperature of the refrigerant passing through the tubing 43, as will be apparent to those skilled in the art. Thus, for example, the valve means 67 may be adapted to allow a certain quanity of water (e.g., one gallon per minute) to flow through the outer coil of hollow tubing 47 when the temperature of the refrigerant flowing through the tubing 43 to the inner coil of hollow tubing 47 is in the neighborhood of 105° F. From the second water-refrigerant heat exchanger means 45, the refrigerant will pass through the tubing 55 to the coil of hollow tubing 57 whereby the refrigerant will absorb heat from the air being blown thereover by the blower means 63 thereby cooling the air, as will be apparent to those skilled in the art. The refrigerant will then pass through the tubing 59, valve 41, and tubing 61 back to the inlet port 15 of the compressor means 13 thus completing one cooling cycle of the air conditioning system 11.

Figure 2:
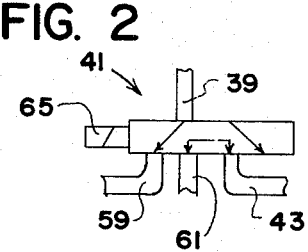
FIG. 2 is a somewhat diagrammatic view of a portion of the air conditioning system of the present invention.

When it is desired to heat the air being blown over the coil of hollow tubing 58, the solenoid means 65 is activated to move the valve means 41 to the position shown in FIG. 2. In this position, the compressed refrigerant will flow through the tubing 19 to the inner coil of hollow tubing 27 of the first water-refrigerant heat exchanger means 21. Some heat will be removed from the refrigerant flowing through the inner coil of hollow tubing 27 if the pump 31 is activated to cause water having a temperature less than the temperature of the refrigerant to flow through the outer coil of hollow tubing 25. It should be noted that conditions may be such that the pump 31 should not be activated whereby no heat will be removed from the refrigerant will be added to water flowing through the outer coil of hollow tubing 25 as the refrigerant flows through the inner coil of hollow tubing 27. The refrigerant will then flow from the inner coil of hollow tubing 27 to the valve means 41 through the tubing 39. With the valve means 41 in the position shown in FIG. 2, the refrigerant will flow therethrough to the tubing 59 and through the tubing 59 to the coil of hollow tubing 57 of the air-refrigerant heat exchanger means 56. The air being blown across the coil of hollow tubing 57 by the blower means 63 will absorb heat from the refrigerant flowing through the coil of hollow tubing 57, whereby the air is heated as will be apparent to those skilled in the art. The refrigerant will flow from the coil of hollow tubing 57 to the inner coil of hollow tubing 49 of the second water-refrigerant heat exchanger means 45 through the tubing 55. The refrigerant flowing from the air-refrigerant heat exchanger means 56 to the second water-refrigerant heat exchanger means 45 will have much of the heat removed therefrom by the air being blown over the coil of hollow tubing 58 by the blower means 63. As the refrigerant flows through the inner coil of hollow tubing 49, it will absorb heat from water flowing through the outer coil of hollow tubing 47 since the water will have a higher temperature than the refrigerant (e.g., the refrigerant may typically have a temperature of −22° F. when it enters tubing 49). The amount of water flowing through the outer coil of hollow tubing 47 is controlled by a heat sensitive valve means 69. Thus, for example, the valve means 69 may be adapted to allow a certain quantity of water (e.g., 4½ gallons per minute) to flow through the outer coil of hollow tubing 47 when the temperature of the refrigerant flowing through the tubing 47 from the inner coil of hollow tubing 47 is in the neighborhood of 45° F. The refrigerant will flow from the inner coil of hollow tubing 49 to the valve means 41 through the tubing 43. With the valve means 41 in the position shown in FIG. 2, the refrigerant from the tubing 43 will flow therethrough to the tubing 61 and be drawn into the compressor means 13 through the inlet port 15.

Although the invention has been described and illustrated with respect to a preferred embodiment thereof, it is not to be so limited since changes and modifications may be made therein which are within the full intended scope of the invention.

I claim:

1. An air conditioning system comprising, in combination: a refrigerant; a compressor means for compressing said refrigerant; a first water-refrigerant heat exchanger means for receiving said refrigerant from said compressor means and for regularly reducing the temperature of said refrigerant to below a certain predetermined degree; a hot water tank; a pump means for selectively pumping water from said hot water tank through said first water-refrigerant heat exchanger means to remove heat from said refrigerant received by said first water-refrigerant heat exchanger means; a second water-refrigerant heat exchanger means for receiving said refrigerant from said first water-refrigerant heat exchanger means; heat sensitive means for directing water through said second water-refrigerant heat exchanger means when the temperature of said refrigerant passing from said first water-refrigerant heat exchanger means to said second water-refrigerant heat exchanger means is above said certain predetermined degree; an air-refrigerant heat exchanger means for receiving said refrigerant from said first and second water-refrigerant heat exchanger means; and a blower means for blowing air across said air-refrigerant heat exchanger means causing an exchange of heat between said refrigerant being received by said air-refrigerant heat exchanger means and the air being blown across said air-refrigerant heat exchanger means to thereby condition the air being blown across said air-refrigerant heat exchanger means.

* * * * *